(12) United States Patent
Chang et al.

(10) Patent No.: US 7,317,916 B1
(45) Date of Patent: Jan. 8, 2008

(54) STRATOSPHERIC-BASED COMMUNICATION SYSTEM FOR MOBILE USERS USING ADDITIONAL PHASED ARRAY ELEMENTS FOR INTERFERENCE REJECTION

(75) Inventors: Donald C. D. Chang, Thousand Oaks, CA (US); Alan Cha, Glendale, CA (US); Jacqueline C. Chen, La Canada, CA (US); Frank A. Hagen, Palos Verdes Estates, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1597 days.

(21) Appl. No.: 09/661,725

(22) Filed: Sep. 14, 2000

(51) Int. Cl.
   *H04Q 7/20* (2006.01)
(52) U.S. Cl. .................. 455/430; 455/13.2; 455/431; 455/429; 455/13.3; 370/320; 370/335; 370/342
(58) Field of Classification Search ........... 342/373, 342/372, 157, 368, 377; 455/922.1, 424, 455/429, 430, 431, 445, 448, 11.1, 12.1, 13.3, 455/562.1, 561; 370/535–537, 320, 335, 370/342; 343/705, 706, 751, 757, 777
   See application file for complete search history.

(56) References Cited

U.S. PATENT DOCUMENTS

| | | | |
|---|---|---|---|
| 3,720,953 A | 3/1973 | Ajioka | |
| 4,085,368 A * | 4/1978 | Yeh | 375/332 |
| 4,343,005 A | 8/1982 | Han et al. | |
| 4,635,063 A | 1/1987 | Chang et al. | |
| 4,727,503 A * | 2/1988 | McWhirter | 708/200 |
| 4,799,065 A | 1/1989 | Thompson | |
| 5,017,927 A | 5/1991 | Agrawal et al. | |
| 5,077,562 A | 12/1991 | Chang et al. | |
| 5,151,706 A | 9/1992 | Roederer et al. | |
| 5,218,619 A | 6/1993 | Dent | 375/1 |
| 5,339,330 A * | 8/1994 | Mallinckrodt | 370/320 |
| 5,361,074 A * | 11/1994 | Hansen | 342/381 |
| 5,548,801 A | 8/1996 | Araki et al. | |
| 5,550,809 A | 8/1996 | Bottomley et al. | 370/18 |
| 5,555,257 A | 9/1996 | Dent | 370/95.1 |
| 5,572,216 A | 11/1996 | Weinberg et al. | 342/357 |

(Continued)

FOREIGN PATENT DOCUMENTS

EP 0 549 220 A2 6/1993

(Continued)

OTHER PUBLICATIONS

U.S. Appl. No. 09/655,041, filed Sep. 05, 2000, Chang et al.

(Continued)

*Primary Examiner*—George Eng
*Assistant Examiner*—Marcos L. Torres

(57) ABSTRACT

A communication system has a stratospheric platform with a payload controller and a phased array antenna having a plurality of main array elements for generating a plurality of communication beams and a plurality of auxiliary elements for canceling interference between the communication beam. A gateway station communicates with the stratospheric platform. The gateway station scales the plurality of elements to form a reconfigurable plurality of beams. The gateway station communicates an embedded control signal to the stratospheric platform to communicate a scaling of elements to form the communication beams and the auxiliary element output. The auxiliary element output is used to provide interference canceling.

6 Claims, 5 Drawing Sheets

U.S. PATENT DOCUMENTS

| | | | |
|---|---|---|---|
| 5,584,047 A | 12/1996 | Tuck | |
| 5,589,834 A | 12/1996 | Weinberg | |
| 5,594,941 A | 1/1997 | Dent | 455/13.4 |
| 5,612,701 A | 3/1997 | Diekelman | |
| 5,715,516 A * | 2/1998 | Howard et al. | 455/422.1 |
| 5,732,351 A | 3/1998 | Olds et al. | |
| 5,734,982 A | 3/1998 | Endo et al. | |
| 5,754,139 A | 5/1998 | Turcotte et al. | |
| 5,764,187 A | 6/1998 | Rudish et al. | |
| 5,810,284 A | 9/1998 | Hibbs et al. | 244/13 |
| 5,856,804 A | 1/1999 | Turcotte et al. | 342/371 |
| 5,862,480 A | 1/1999 | Wild et al. | |
| 5,890,067 A | 3/1999 | Chang et al. | |
| 5,894,590 A | 4/1999 | Vatt et al. | |
| 5,903,549 A | 5/1999 | Von der Embse et al. | 370/310 |
| 5,907,816 A | 5/1999 | Newman et al. | |
| 5,909,460 A | 6/1999 | Dent | 375/200 |
| 5,909,470 A | 6/1999 | Barratt et al. | |
| 5,917,447 A | 6/1999 | Wang et al. | |
| 5,946,625 A | 8/1999 | Hassan et al. | |
| 5,949,766 A | 9/1999 | Ibanez-Meier et al. | 370/316 |
| 5,966,371 A | 10/1999 | Sherman | |
| 5,973,647 A | 10/1999 | Barrett et al. | |
| 5,974,317 A | 10/1999 | Djuknic et al. | |
| 5,982,337 A | 11/1999 | Newman et al. | |
| 5,991,329 A * | 11/1999 | Lomp et al. | 375/130 |
| 6,016,124 A | 1/2000 | Lo et al. | |
| 6,016,421 A | 1/2000 | Weiss et al. | |
| 6,018,316 A | 1/2000 | Rudish et al. | |
| 6,020,845 A | 2/2000 | Weinberg et al. | |
| 6,023,463 A | 2/2000 | Wiedeman et al. | |
| 6,047,186 A | 4/2000 | Yu et al. | |
| 6,061,562 A | 5/2000 | Martin et al. | |
| 6,088,341 A | 7/2000 | Hinedi et al. | |
| 6,147,658 A | 11/2000 | Higashi et al. | |
| 6,151,308 A | 11/2000 | Ibanez-Meier et al. | 370/316 |
| 6,157,811 A | 12/2000 | Dent | |
| 6,160,994 A | 12/2000 | Wiedeman | |
| 6,167,263 A | 12/2000 | Campbell | |
| 6,188,896 B1 | 2/2001 | Perahia et al. | |
| 6,240,072 B1 | 5/2001 | Lo et al. | |
| 6,249,514 B1 | 6/2001 | Campanella | |
| 6,289,004 B1 | 9/2001 | Mesecher et al. | |
| 6,308,085 B1 | 10/2001 | Shoki | |
| 6,324,398 B1 | 11/2001 | Lanzerotti et al. | |
| 6,339,708 B1 | 1/2002 | Wang | |
| 6,343,205 B1 | 1/2002 | Threadgill et al. | |
| 6,366,256 B1 | 4/2002 | Ramanujam et al. | |
| 6,380,893 B1 * | 4/2002 | Chang et al. | 342/373 |
| 6,388,615 B1 | 5/2002 | Chang et al. | |
| 6,392,611 B1 | 5/2002 | Smith et al. | |
| 6,434,384 B1 | 8/2002 | Norin et al. | |
| 6,452,962 B1 | 9/2002 | Linsky et al. | |
| 6,456,846 B2 | 9/2002 | Norin et al. | |
| 6,463,282 B2 | 10/2002 | Norin et al. | |
| 6,463,294 B1 | 10/2002 | Holma et al. | |
| 6,507,314 B2 | 1/2003 | Chang et al. | |
| 6,507,739 B1 * | 1/2003 | Gross et al. | 455/431 |
| 6,513,758 B1 * | 2/2003 | Lloyd | 244/129.1 |
| 6,526,288 B1 * | 2/2003 | Khalifa et al. | 455/557 |
| 6,556,845 B1 * | 4/2003 | Ide et al. | 455/562.1 |
| 6,598,014 B1 | 7/2003 | Rabideau et al. | |
| 6,615,024 B1 | 9/2003 | Boros et al. | |
| 6,819,943 B2 | 11/2004 | Dalal | |
| 6,895,217 B1 | 5/2005 | Chang et al. | |
| 2001/0004604 A1 | 6/2001 | Toshimitsu et al. | |
| 2001/0038342 A1 | 11/2001 | Foote | |
| 2002/0006795 A1 | 1/2002 | Norin | |
| 2002/0126042 A1 | 9/2002 | Chang et al. | |
| 2002/0128044 A1 | 9/2002 | Chang et al. | |
| 2002/0128045 A1 | 9/2002 | Chang et al. | |
| 2002/0132643 A1 | 9/2002 | Chang et al. | |
| 2002/0140602 A1 | 10/2002 | Chang et al. | |
| 2002/0168991 A1 | 11/2002 | Kochanski et al. | |
| 2003/0076258 A1 | 4/2003 | Chang et al. | |

FOREIGN PATENT DOCUMENTS

| | | |
|---|---|---|
| EP | 0776 099 A2 | 5/1997 |
| EP | 0 860 952 A | 8/1998 |
| EP | 0 961 416 A1 | 12/1999 |
| EP | 1 026 778 A | 8/2000 |
| EP | 1 139 583 A2 | 10/2001 |
| EP | 1 148 662 A2 | 10/2001 |
| EP | 1 152 552 A2 | 11/2001 |
| GB | 2 349 045 | 10/2000 |
| JP | 11 261474 A | 9/1999 |
| WO | WO 97 07609 A | 2/1997 |
| WO | WO 00/14902 A2 | 3/2000 |
| WO | WO 01/95220 A2 | 12/2001 |
| WO | WO 01/95523 A3 | 12/2001 |
| WO | WO 02/058186 A2 | 7/2002 |
| WO | WO 02/058272 A2 | 7/2002 |
| WO | WO 02/058273 A2 | 7/2002 |

OTHER PUBLICATIONS

U.S. Appl. No. 09/611,753, filed Jul. 07, 2000, Chang et al.

U.S. Appl. No. 09/644,224, filed Aug. 21, 2000, Chang et al.

U.S. Appl. No. 09/661,967, filed Sep. 14, 2000, Feria et al.

K. K. Chan, F. Marcoux, M. Forest, L. Martins-Camelo, "A Circularly Polarized Waveguide Array for Satellite Communications", pp. 154-157, IEEE1999 AP-S International Symposium, Jun. 1999.

M. Oodo, R. Miura, Y. Hase, "Onboard DBF Antenna for Stratospheric Platform", pp. 125-128, IEEE Conference on Phased Array Systems and Technology, California, May 21-25, 2000.

Yokosuka Research Park, "The First Stratospheric Platform Systems Workshop", pp. 1-216, May 12-13, 1999.

Suzuki, R. et. al, :Mobile TDM/TDMA System With Active Array Antenna, Global Telecommunications Conference, 1991; Globecom '91, vol. 3, Dec. 2-5, 1991, pp. 1569-1573.

Chiba, Isamu et. al, "Digital Beam Forming (DBF) Antenna System for Mobile Communications", IEEE AES Systems Magazine, Sep. 1997, pp. 31-41.

Miura, Ryu et. al, "A DBF Self-Beam Steering Array Antenna for Mobile Satellite Applications Using Beam-Space Maximal-Ratio Combination", IEEE Trans. On Vehicular Technology, vol. 48, No. 3, May 1999, pp. 665-675.

Colella, Nicholas J. et al., "The HALO Network™", IEEE Communications Magazine, Jun. 2000, pp. 142-148.

Colella, Nicholas J. et al., "High Speed Internet Access via Stratospheric HALO Aircraft", INET 99 Proceedings, Internet Society, Technology, Wireless, 13 pages, Jun. 8, 1999.

Colella, Nicholas, "HALO Network—The Birth of Stratospheric Communications Services & the Decline of Satellite Networks", http://www.angelhalo.com/techpaper6.Copyright 1997-1999.

Djuknic, Goran et al., "Establishing Wireless Communications Services via High-Aeronautioal platforms: A Concept Whose Time Has Come?" IEEE Communications Magazine, Sep. 1997, pp. 128-135.

Martin, James N. et al., "HALO Network—The Cone of Commerce", http://www.angelhalo.com/techpaper2, copyright 1997-1998.

Martin, James N. et al., "HALO Network—Broadband Wireless Services from High Altitude Long Operation (HALO) Aircraft", http://www.angelhalo.com/techpaper2, copyright 1997-1998.

Akyildiz, Ian F. et al., "HALO (High Altitude Long Operation): A Broadband Wireless Metropolitan Area Network", IEEE International Workshop on Mobile Multimedia Communications, Nov. 1999, pp. 271-275.

U.S. Appl. No. 09/661,986, filed Sep. 14, 2000, Rosen et al.

* cited by examiner

STRATOSPHERIC-BASED COMMUNICATION SYSTEM FOR MOBILE USERS USING ADDITIONAL PHASED ARRAY ELEMENTS FOR INTERFERENCE REJECTION

TECHNICAL FIELD

The present invention relates generally to a platform based communication system and more particularly, to a communication system using a stratospheric platform and a gateway station that forms the multiple beams on the ground using interference canceling by controlling interference using additional antenna elements.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, "bent pipe" satellites transmit and receive large amounts of signals used or "multiple spot beam" configuration to transmit signals to desired geographic locations on the earth. Mobile applications such as telephones and personal digital applications are becoming increasingly popular.

All of these current mobile satellite communication systems, however, suffer from a variety of disadvantages. First, they all have limited frequency resources. Any given frequency over a given ground position can only be utilized by one user with mobile handset at a time. This is true regardless of the sophistication of the system, including systems that utilize multiple beam satellite designs. Even when multiple satellites are available at a given geographic location, the same frequency spectrum cannot be used by more than one nearby mobile handset user. The availability of multiple satellites merely serves to increase the availability of the system to that mobile handset user who is assigned the specific frequency spectrum. However, the total capacity of these mobile communication satellite systems is still limited by the inefficient usage of the frequency spectrum. Thus, the potential growth of these current satellite communication systems is inherently limited.

Additionally, current telecommunications systems only allow mobile-to-hub and hub-to-mobile communications in most of the low earth orbit and medium earth orbit mobile satellite constellations. Mobile-to-mobile linkages require multiple hops between hubs. Thus, one user with a mobile handset utilizes a satellite at a frequency slot to communicate to his counterpart on the network. Other satellites on or in the same region cannot reuse the same frequency slot for other nearby handset users. Thus, if a secondary user nearby has a handset that requires a particular frequency, which is being utilized by the first user nearby, the second user is unable to access the system through the same frequency via different satellites.

As described in U.S. Pat. No. 5,903,549, satellites may use a phased array antenna to communicate with users on the ground. The phased array antenna is comprised of a plurality of elements that are used to form a beam. The beam forming is implemented by adjusting the amplitude and phase of each signal path routed to each feed element. Each individual signal path is routed to multiple feeds with relative amplitudes and phases, which define each intended beam. In the '549 patent, the beam forming has been removed from the satellite and is performed on the ground. This reduces the complexity of the payload of the satellite.

Implementing a mobile communication system using a satellite is relatively expensive due to the typical complexity of the satellite payload and the expense of launch. The satellites also use a relatively low gain antenna, which is sometimes inadequate for third generation (3-G) cellular type systems. Because of the complexity, the satellites cannot be deployed quickly and thus, from a business standpoint, market share may be lost. Also, as new technology develops, the satellite must be replaced which is also very expensive.

Limitations to the number of users may be inhibited by interference in systems. That is, for every beam having a main lobe, a parasitic number of side lobes exist which may cause interference with beams using the same system resource such as frequency.

It would therefore be desirable to provide a mobile communication system that is capable of rapid deployment, is easy to change, should the technology inevitably change and reduces the amount of interference with adjacent beams to permit high throughput.

SUMMARY OF THE INVENTION

It is therefore an object of the invention to provide a mobile communication system that allows rapid deployment and provides interference rejection. It is a further object of the invention to provide a stratospheric platform based mobile communication system.

In one aspect of the invention, a communication system has a stratospheric platform with a payload controller and a phased array antenna having a plurality of main array elements for generating a plurality of communication beams and a plurality of auxiliary elements for canceling interference between the communication beam. A gateway station communicates with the stratospheric platform. The gateway station scales the plurality of elements to form a reconfigurable plurality of beams. The gateway station communicates an embedded control signal to the stratospheric platform to communicate a scaling of elements to form the communication beams and the auxiliary element output. The auxiliary element output is used to provide interference canceling.

In a further aspect of the invention, a method of controlling a communication system having a stratospheric platform with a phased array antenna having a plurality of elements, main array elements and a plurality of auxiliary elements, comprises the steps of:

forming a plurality of communication beams in a gateway station by scaling a plurality of elements;

forming a plurality of auxiliary element outputs as a function of the plurality of the communication beams by forming auxiliary element control signals;

communicating the scaling of elements and the auxiliary element control signals to a stratospheric platform; and generating the communication beams in response to the scaling of elements by the stratospheric platform; and generating the auxiliary element outputs in response to the auxiliary element control signals by the stratospheric platform.

One advantage of the invention is that due to the interference detection, system throughput is increased over conventional systems.

Another advantage of the invention is that the payload weight and power consumption are significantly reduced without impacting system performance. The whole beam forming and traffic switching or routing mechanisms, normally on board the platform, have been moved to ground, taking advantage of the unique "spoke and hub" communications traffic topology. The payload only requires a small number of array elements to provide interference canceling.

Other features and advantages of the present invention using digital beam forming on ground are readily apparent from the following detailed description of the best mode for carrying out the invention when taken in connection with the accompanying drawings.

BEST MODES FOR CARRYING OUT THE INVENTION

Figure 1:
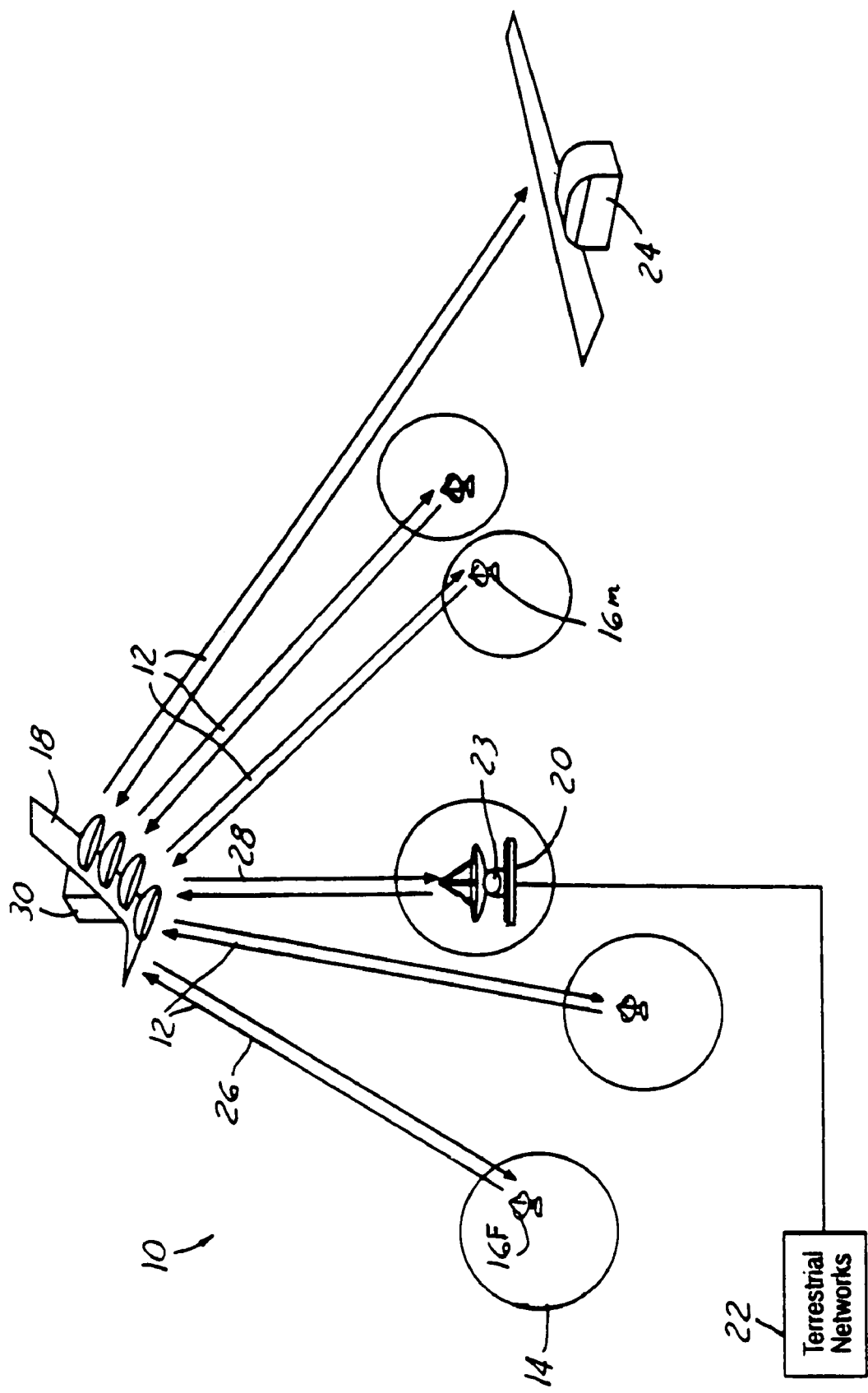
FIG. 1 is a system diagram of a communication system according to the present invention.

In the following description, the same reference numerals are used to identify the same components in the various views. Those skilled in the art will recognize that various other embodiments, structural changes and changes in measures may be made without departing from the scope of the invention.

Referring now to FIG. 1, a communications system 10 has a plurality of beams 12 that are illustrated as a plurality of circles 14 on the earth's surface. Circles 14 represent the footprint of a radiated beam onto the earth's surface. A plurality of user terminals 16M and 16F are used to illustrate mobile users and fixed users, respectively. Mobile users 16M may comprise but are not limited to automotive applications, personal digital assistant applications and cellular phone applications. Fixed user terminals 16F may, for example, comprise business-based or consumer-based communication systems. Each user terminal 16F and 16M may receive a signal with the predetermined signal strength from a spot beam pattern that is radiated from stratospheric platform 18. The present invention is particularly advantageous for use with mobile terminals 16M.

Communication system 10 further includes a gateway station 20 that is coupled to terrestrial networks 22. Communication system may also include a platform operations center 24. Both gateway station 20 and platform operations center 24 are in communication with stratospheric platform 18. Gateway station 20 provides a link between user terminals 16F, 16M and terrestrial networks 22 through stratospheric platforms 18. Platform operation center 24 provides command and control functions to communications platform 18. Although illustrated as two separate units, gateway station 20 and platform operation center 24 may be combined into the same physical location.

The communication signals between stratospheric platform 18 and user terminals 16M and 16F may be referred to as user links 26. User links 26 represent the transmit and receive beams from both categories of user terminals 16F, 16M and high altitude communications platform 18. A feeder link 28 is defined between high altitude communications platform 18 and gateway station 20.

High altitude communications platform 18 is preferably a stratosphere-based platform such as those under development by AeroVironment. Helios is one such project being developed by AeroVironment and is an unmanned vehicle that can fly for several months at an altitude of over 60,000 feet above the earth. Helios is a solar-powered, electric plane that is modular in design and may be configured in a variety of ways. The stratospheric platform is operated through the platform operations center 24 to fly in a small radius flight path over a given spot on the earth. As far as users are concerned, the platform is geo-stationary. In addition to a plane-like platform, the stratospheric platform may comprise a balloon or blimp-like platforms.

Stratospheric platform 18 is used as a communication node for gateway station 20 and user terminals 16F and 16M, each of which have an antennas that are pointed in the direction of the high altitude communications platform 18. As will be described below, the pointing from mobile terminals 16M may be performed electronically. Although only one gateway station 20 is illustrated in the figure, those skilled in the art would recognize that various numbers of gateway stations may be employed. As would be further described below, gateway is station 20 with a high gain antenna that has a narrow beam width. The antenna may need a tracking mechanism with tracking speed adequate enough to maintain a communication link with the platform 18 throughout the flight path. Gateway station 20 may be coupled to terrestrial networks 22 such as the public service telephone network, the Internet, or an intranet. Gateway station 20 has communications processing facility 23 that controls the communication with the high altitude communications platform 18.

High altitude communication platform 18 has a payload 30 that links with user terminal 16M, 16F through the use of a phased array antenna and gateway station 20 with a feeder link antenna (preferably a parabolic dish) described below. In the present example, the payload 30 is used to generate a plurality of user beams configured according to the signals as determined in the gateway station 20.

Figure 2:
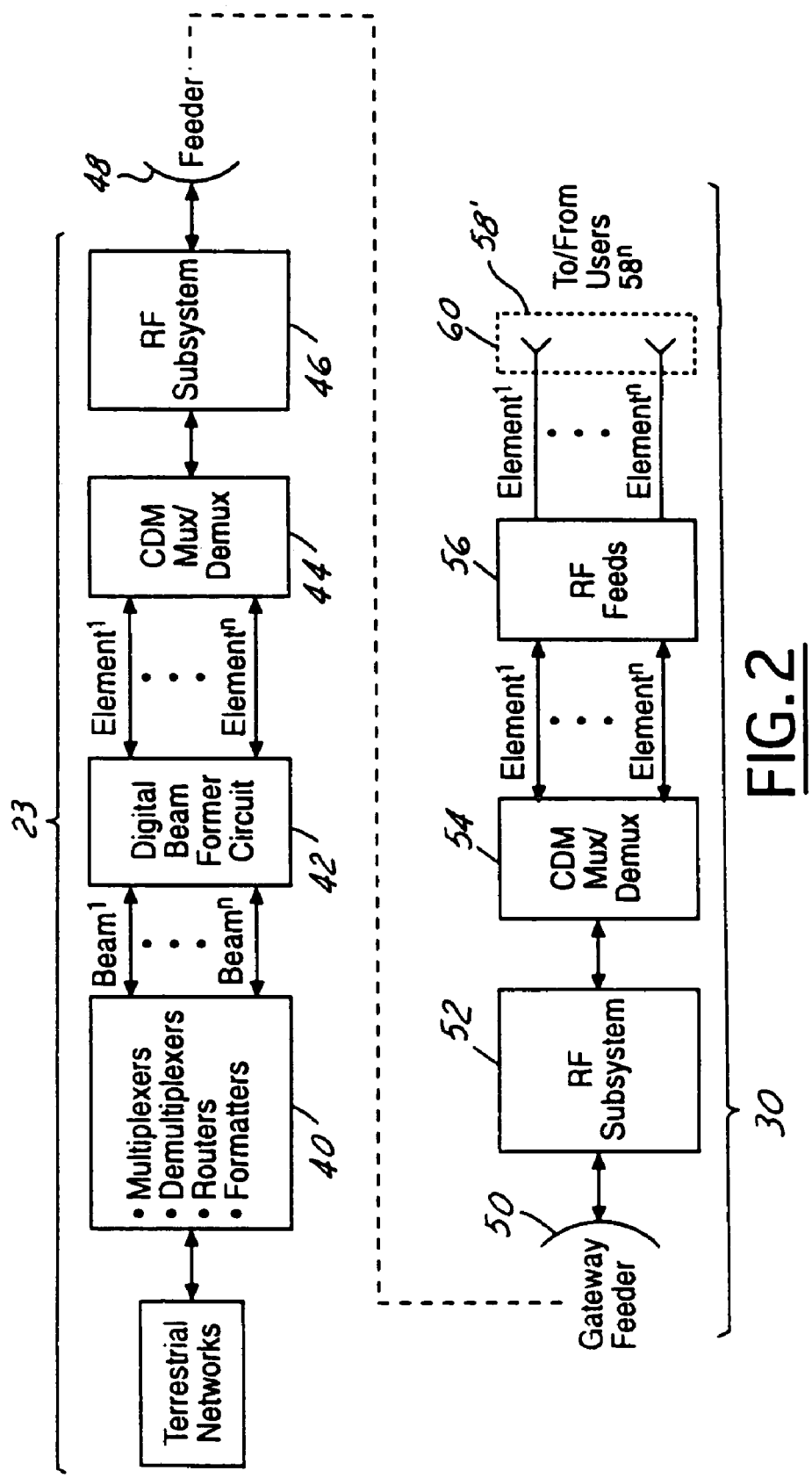
FIG. 2 is a high-level block diagrammatic view of the gateway station and payload platform according to the present invention having a digital beam forming circuit according to the present invention.

Referring now to FIG. 2, a block diagrammatic view of ground processing facility 23 and payload 30 are illustrated. Ground processing facility 23 has an interface electronics 40 that may represent a plurality of different circuits. For example, beam generator 40 may comprise multiplexers, demultiplexers, routers and formatters. The interface electronics 40 may receive signals from the terrestrial networks 22 or may route various signals from different downlink beams from the platform 18 to the corresponding uplink bins. The "content" of all the uplink beams is placed into these buffers in the interface electronics 40. As illustrated, the signals of beam$^1$ through beam$^n$ represent the buffered "content" that generated by interface electronics 40 and will be sent next to digital beam former circuit 42. The buffered signals are coupled to digital beam former circuit 42. Digital beam former circuit 42 generates main element control signals and auxiliary element control signals that are ultimately used to control the phase of the main array elements and auxiliary elements of the platform 18. Digital beam former circuit 42 "scales" all user signals by (1) dividing each user signal into number of paths, each corresponding to one element, (2) multiplying each user signal component according to the signal direction by amplitude and phase weighting, and (3) adding various user components together element by element, and (4) putting the component sum to corresponding element bins. As a result, the user direction information have been embedded in the way the overall signal set is organized, not by separated direction control signals. As will be further described below in FIG. 4, the digital beam former circuit 42 may include the control of additional phased array elements to provide interference canceling.

The digital beam former circuit 42 forms a plurality of element signals of $element^1$ through $element^n$. The element signals are coupled to code division multiplexers/demultiplexer 44. The bundled element control signals are then provided to an RF subsystem 46 that is used to transmit the aggregated signals through feeder antenna 48 to the high altitude communication platform 18. The platform 18 has an antenna 50 used to receive the aggregated element-signals from the gateway station 20. The feeder link antenna 50 is coupled to an RF subsystem 52 that processes the received signals in a conventional manner, including amplification, filtering and frequency down conversion. The RF subsystem 52 is coupled to code division multiplexer/demultiplexer 54 that separates the aggregated signals to individual element signals; the signals of $element^1$ to that of $element^n$. The demultiplexer 54 has regenerated all the element signals developed by digital beam former circuit 42 on ground as discussed above. The regenerated element signals are sent to RF feeds 56, that provide the signals to the radiating aperture 58 of the phased array antenna 60. There are no phase shifters in the array. The element phasings for each beam are implemented in the digital beam former on ground and are embedded in the signal overall structure. All user signals will be transmitted simultaneously through the aperture. Thus, a user (user A) signal radiated from various elements will ultimately be added coherently in the designated direction (say, direction A) in far field, while other user signals designated for other directions will be added randomly in direction A. Similarly, in the far field along direction B, signals designated for other users at the same frequency band but designated for different directions will be added non-coherently.

Those skilled in the art would recognize that the ground processing facility 23 and payload 30 are also used for receiving signals from the users. Such systems operate in a reverse manner from that described above and therefore is not repeated.

Figure 3:
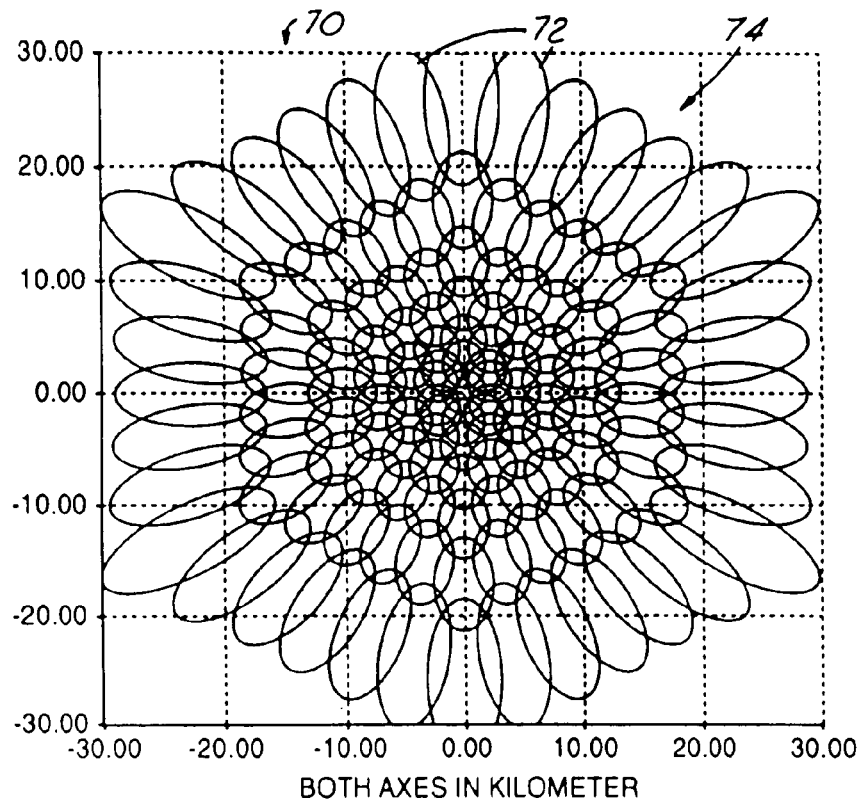
FIG. 3 is a plot of cell coverage according to the present invention.

Referring now to FIG. 3, a cell pattern 70 has a plurality of beams 72 that are generated by the stratospheric platform. As illustrated, a hexagon is generally formed to define a service area 74.

Figure 4:
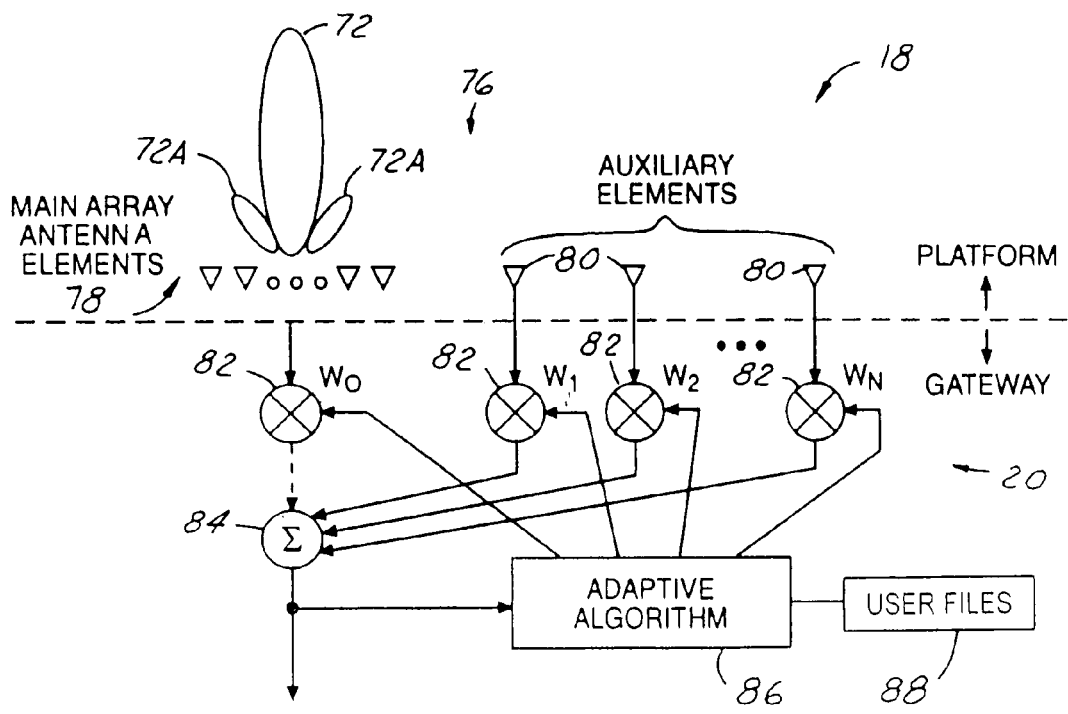
FIG. 4 is a diagrammatic view of the digital beam forming circuit for controlling addition elements according to the present invention.

Referring now to FIG. 4, the high altitude communication platform 18 is generally illustrated having a phased array antenna 76 having a plurality of main array antenna elements 78 that are used to form the coverage pattern of FIG. 3. Although only one beam 72 is illustrated having side lobes 72A, each beam is shaped similarly. Gateway station 20 uses ground beam forming to form the beams using main array elements 78 as described above. In addition, phase array antenna 76 has a plurality of auxiliary elements 80. As will be described below, auxiliary elements 80 are used for interference canceling. In one constructed embodiment, ninety-six main array elements 78 and five auxiliary elements 80 are used. That is, the ninety-one elements are configured to form the 127 antenna beams of FIG. 3. By using a controlled side lobe level, the ninety-one element array is designed for a −20 dB relative side lobe level using a 10 dB aperture illumination taper. The −20 dB relative side lobe level allows many users and different styles to use the same CDMA code address with acceptable interference level based on link analysis. Throughput is increased with the use of the five auxiliary elements 80 that act as side lobe cancellers. The present invention is particularly suitable for situations in which the user is aligned with the peak of the side lobe level. In such a situation, the present invention is applied and the five elements may be used to provide effective enhancement of interference rejection to a large number of simultaneous beams.

Gateway station 20 has multiplication blocks 82 that are used to assign a weight to the auxiliary elements 80 as well as main array elements 78. The weights of the auxiliary elements 80 are summed in the summing block 84. The weights of multiplication blocks 82 may be determined using an adaptive algorithm 86. The adaptive algorithm 86 may, for example, be coupled to user files 88 that includes the direction of strong interfering sources for each active beam from user positions.

Figure 5A:
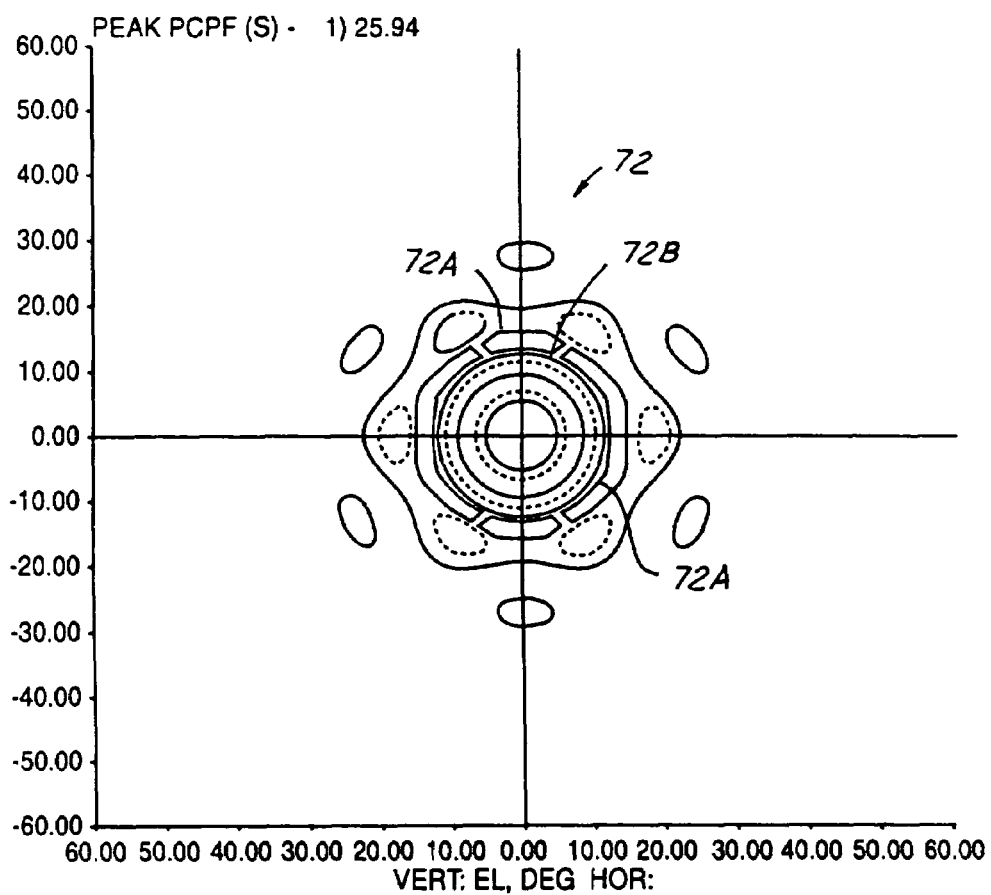
FIGS. 5A and 5B are a respective topological gain plot of a zero degree beam formed according to the present invention.
Figure 5B:
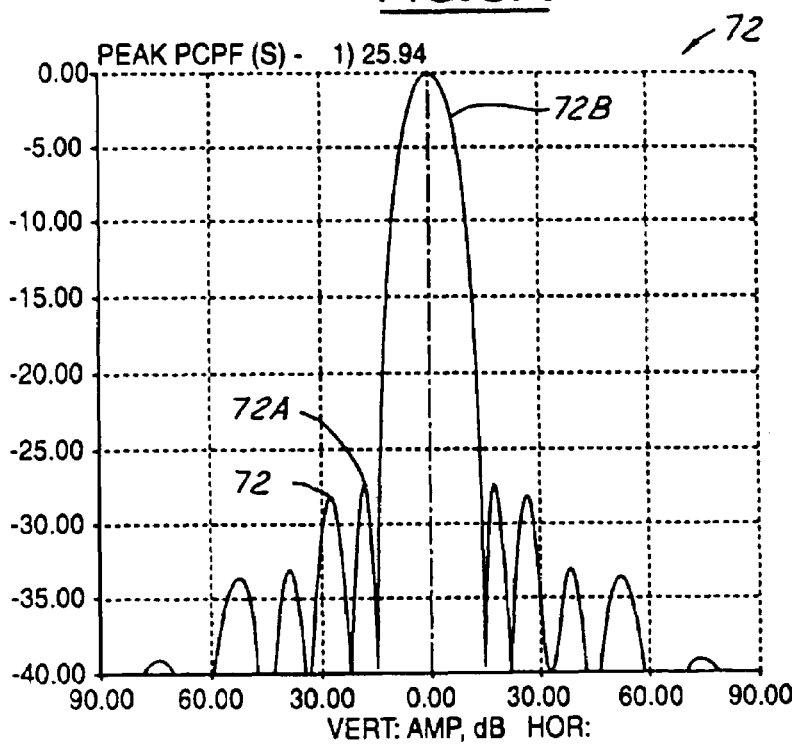

Referring now to FIGS. 5A and 5B, a beam 72 having a mainlobe 72B and side lobes 72A are illustrated. For this beam, the side lobe level is less than −20 dB relative to the peak of the mainlobe. In most circumstances, the side lobe performance would be satisfactorily to support user services under normal circumstances based on a link budget.

Figure 6A:
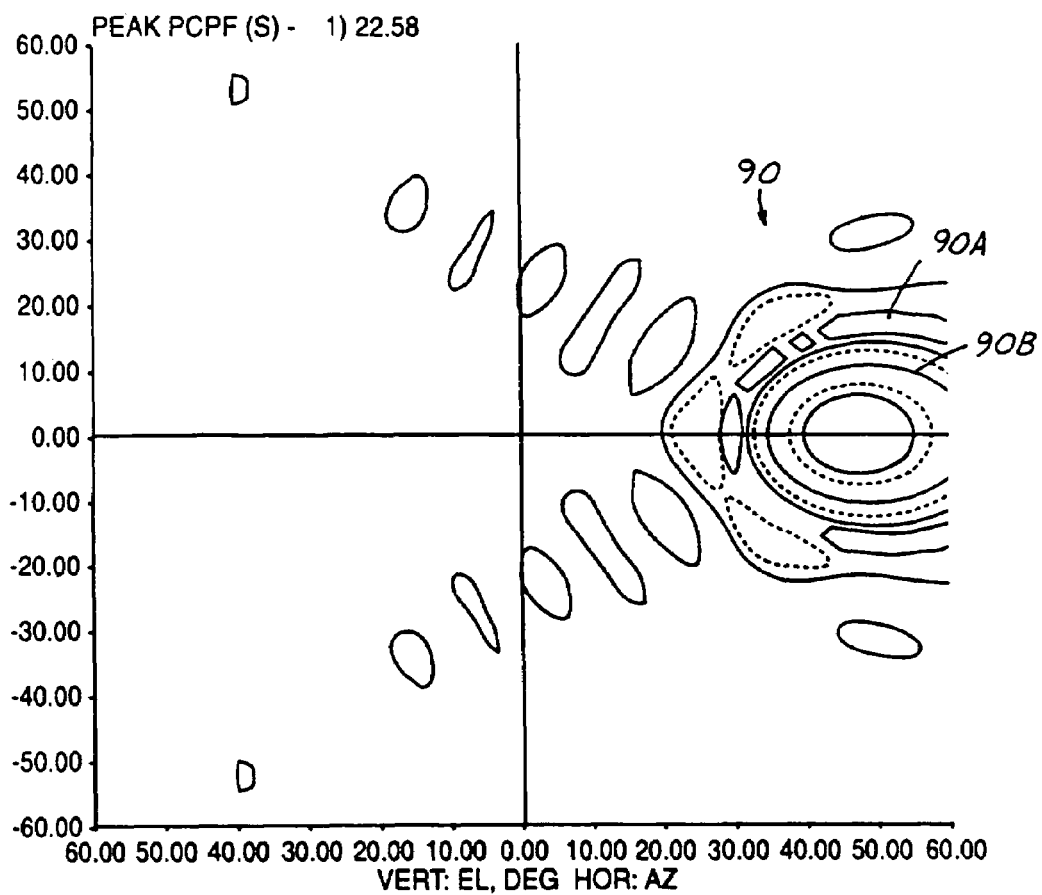
FIGS. 6A and 6B are a respective topological plot and gainplot of a fifty degree beam formed according to the present invention.
Figure 6B:
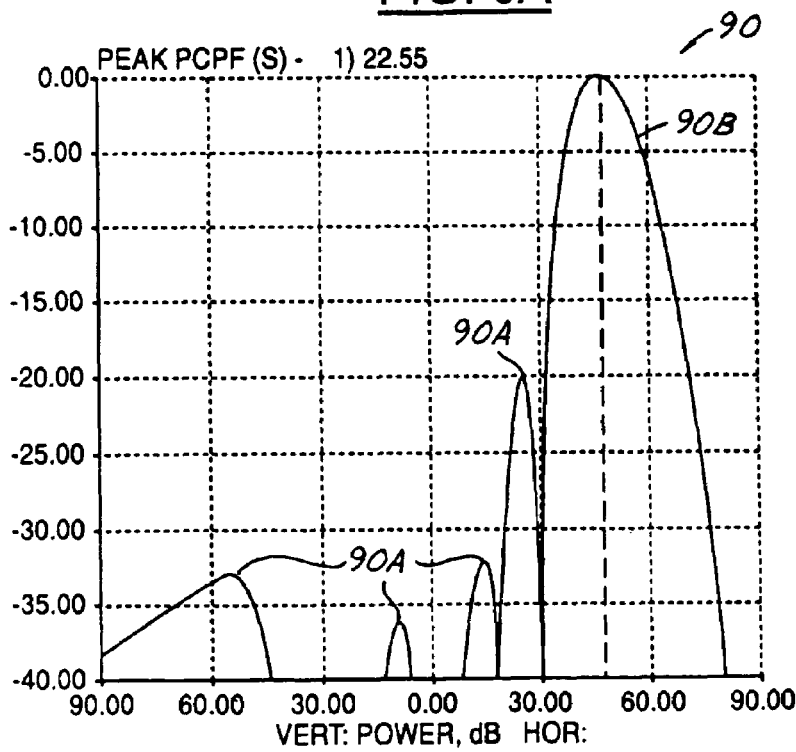

Referring now to FIGS. 6A and 6B, a beam 90 having side lobes 90A and mainlobe 90B is illustrated. In this example, the peak of the side lobe 90A is only 20 dB below the peak of the mainlobe 90B. Therefore, interference is more likely with such a configuration.

In operation, main array antenna elements 78 are used to generate the communication beams of the present invention. The auxiliary elements 80 are used to cancel interference from the main array antenna elements as needed. That is, by using user files 88 that have the positions of users stored therein, weights may be determined for auxiliary elements 80 so that the auxiliary elements 80 will have an auxiliary element output to cancel interference from the communication beams because the direction of strong interfering sources for each active beam may be determined from user position in the gateway station 20. Weights for the side lobe canceling element outputs are determined in the gateway station and the outputs are combined with the output of the communication beams. That is, the side lobes of the communication beams are selectively cancelled by the auxiliary element output. The side lobes are canceled by the auxiliary element output by generating a signal mathematically formed to provide canceling.

Advantageously, by providing the digital beam forming in the gateway station, all of the beams are formed in a real time manner using the user position files. As the system needs change, the gateway station may adaptively change the output of the auxiliary elements on a continual basis. Also, the digital beam former circuit may include adaptive algorithm 86 and be coupled to user files 88 shown in FIG. 4.

While the best modes for carrying out the invention have been described in detail, those familiar with the art to which this invention relates will recognize various alternative designs and embodiments for practicing the invention as defined by the following claims.

What is claimed is:

1. A communications system, comprising:
   a ground station having;
   a beam generator for generating a plurality of beam control signals,
   a digital beam former circuit receiving the beam control signals and generating a plurality of first element control signals for generating communication beams and a plurality of auxiliary element control signals for canceling interference from the side lobes of the communication beams,
   a multiplexer multiplexing the first element control signals, and
   an RF subsystem for communicating an RF signal corresponding to the first element control signals and the auxiliary element control signals;
   a stratospheric platform having;
   a payload receiver for receiving the RF signals,
   a demultiplexer demultiplexing the RF signals into a second plurality of element control signals corresponding to the first element control signals and a second plurality of auxiliary element control signals and generating a plurality of communication beams in response to the second plurality of element control signals and a plurality of auxiliary element outputs in response to the second plurality of auxiliary element control signals.

2. A system as recited in claim 1, wherein said ground station comprises a gateway station.

3. A system as recited in claim 1, wherein said ground station is coupled to a terrestrial network.

4. A system as recited in claim 3, wherein said terrestrial network comprises the internet.

5. A system as recited in claim 4, wherein the terrestrial network comprises the public service telephone network.

6. A system as recited in claim 1, wherein the gateway station comprises a plurality of multiplication gates each having a respective weight, said auxiliary element output being a function of said weight.

* * * * *